Oct. 12, 1965   K. SATTLER   3,210,900
COMPOSITE STRUCTURE
Filed Oct. 19, 1962   4 Sheets-Sheet 1

Inventor
Konrad Sattler

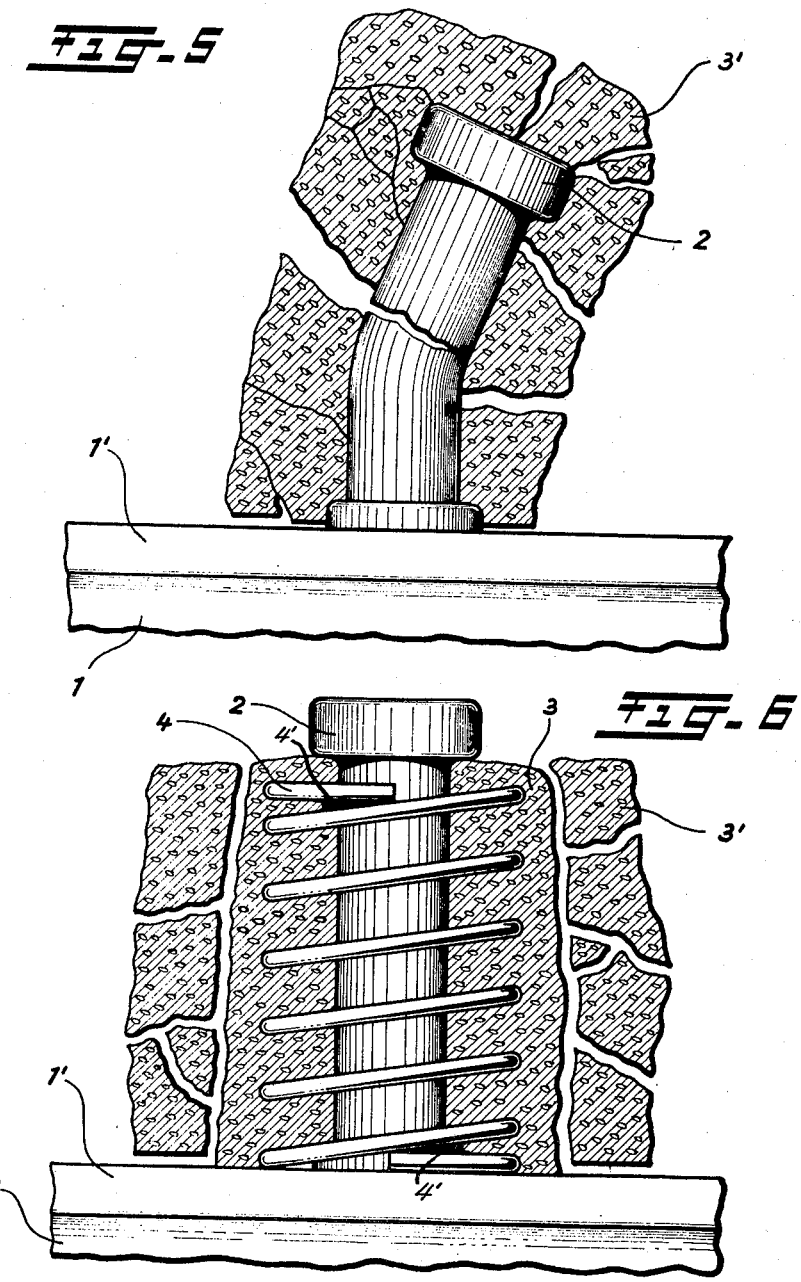

Oct. 12, 1965 K. SATTLER 3,210,900
COMPOSITE STRUCTURE
Filed Oct. 19, 1962 4 Sheets-Sheet 4
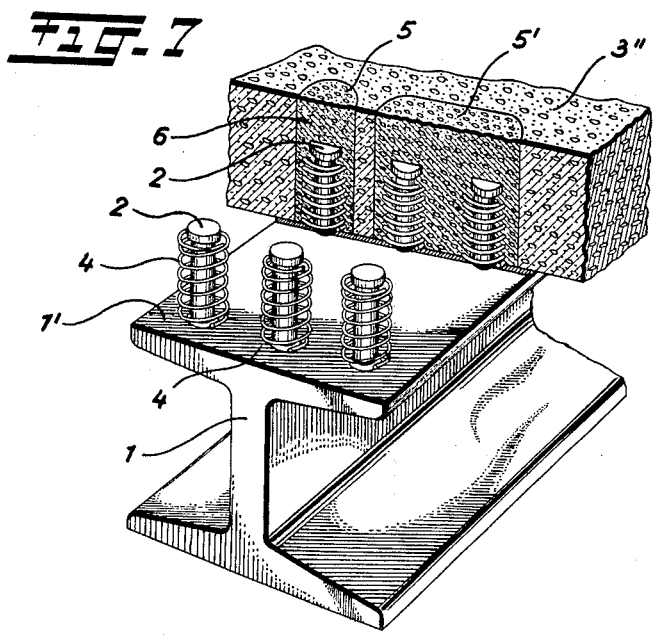
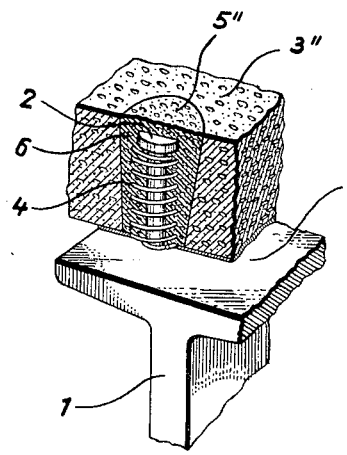
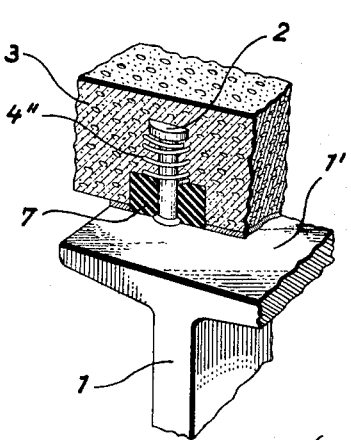
Inventor
Konrad Sattler
By Silverman, Mullin & Coss

United States Patent Office 3,210,900
Patented Oct. 12, 1965

3,210,900
COMPOSITE STRUCTURE
Konrad Sattler, Graz, Austria, assignor to
Crompton Parkinson Limited
Filed Oct. 19, 1962, Ser. No. 231,689
Claims priority, application Germany, Oct. 23, 1961,
P 28,074
2 Claims. (Cl. 52—334)

Steel and concrete structures, for example for the construction of bridges or skyscrapers which are erected by anchoring a concrete superstructure to a steel skeleton have been known for over twenty years. For anchoring the concrete to the steel beams differently shaped studs or anchors are used, depending on the basic characteristics of the entire construction. In Germany, for such composite structures, rigid studs of various rod-like cross-sections, and quite often even anchors of round steel have been used, these being attached to the beams at an angle of less than 45°. However, in addition to shearing forces in a horizontal direction, the concrete superstructure is subjected to tensile forces which are effective in the vertical direction of the beam, and such tensile forces have a tendency to separate the concrete superstructure from the steel beam.

One method for the erection of such composite structures has become known, by means of which the construction is considerably simplified and the cost reduced, using cold-pressed vertically welded studs each having, at one end, an upset end, the upper surface of which is about 25 to 40 millimetres below the upper surface of the concrete superstructure. The welding of the studs is performed semi-automatically using electric stud welding techniques and can easily be done by unskilled workers with hand welding pistols, the welding time being generally below one second. Such a short welding period has the great advantage that the steel beams will not become distorted, even when a large number of studs has to be attached to a single beam. Moreover, the welding process achieves a completely homogenous joint of stud and beam at the welding zone over the entire section of the stud. Upon application of the concrete superstructure, the weld is subjected to shearing forces, whilst the body or shank of the stud exerts a heavy pressure in a horizontal direction upon the lower portion of the concrete superstructure. The concrete superstructure is kept down to the steel beam against shearing forces from each and all directions by the upset ends of the stud. Such studs are provided with their upset ends either by cold pressing without cutting, which is the cheapest way of manufacture, or by screwing a nut onto a threaded end of the stud.

These studs with upset ends are being used more and more frequently for composite structures; in U.S.A. and the United Kingdom they are commonly known as "shear connectors."

An object of the present invention is to provide an improved shear connector arrangement whereby a considerably stronger resistance is achieved to the shear forces which arise in composite structures; and accordingly, permit the number of shear connectors used in any particular structure to be decreased. Consequently, a considerably improved composite structure is achieved by the present invention, and the costs of construction are reduced.

With this object in view, the present invention provides a composite structure comprising one or more steel beams provided with vertical butt welded studs with upset ends which serve as shear connectors for a concrete superstructure, characterised in that each of the welded studs is surrounded from the weld to a point near its upset end by a cylindrically-shaped metallic reinforcement which in turn is embedded in and permeated by the concrete of the superstructure.

The reinforcement, which may be a spiral of round steel, has the effect of reinforcing the concrete around the stud and thus strengthens its resistance to deformation, because any heavy local stresses arising in the concrete around the stud can be absorbed by concrete shearing forces and in the spirals by tensile stresses in the steel. The entire area around the stud therefore remains an undivisible entity. Systematic load tests have clearly substantiated the extraordinarily increased shear resistance. Shear tests of composite structures comprising shear connectors without reinforcing spirals revealed that the studs, at the breaking point, work themselves into the concrete which cracks and is completely destroyed in the vicinity of the studs. In addition the studs were obliquely bent and partly broken above the weld.

Contrary thereto, when shear tests were performed on the arrangements of the invention, the concrete superstructure did not break until the load was considerably in excess of that required with the prior known arrangement and, moreover, the concrete around the studs was intact. The shear connectors were still anchored in the concrete in the region of their surrounding steel spirals. None of the helically-reinforced studs was broken off; and actually none were bent.

Similar good results were obtained when bending tests were made with a composite beam comprising the helically reinforced shear connectors in accordance with the invention, in comparison with similar tests with a composite structure wherein the wire spirals around the welded shear connectors were omitted. Here again it could be observed that on exceeding the crucial bending load, the bond of the concrete to the beam was broken in those regions only which were outside of the helically reinforced shear connectors in the arrangements of the invention.

The use, in composite structures, of shear connectors which are perpendicularly welded to the flange of the steel beam permits also of working with prefabricated concrete superstructures, which is not possible with rigid studs of other shape and/or studs of round steel or with anchors, which are invariably welded at an angle of inclination relative to the steel beam.

In such arrangements employing prefebricated concrete, the wire spiral reinforcement around the welded stud is a tremendous help having regard to the increased shear resistance provided thereby. The working steps in erecting such a structure are, for instance, performed in the following sequence: the shear connectors are firstly welded to the flanges of the beam; the wire spirals are then arranged around the welded studs; a layer of mortar is next applied to the beam, and the prefabricated concrete slabs are positioned on top of such mortar; and finally recesses in the slabs, in which recesses the shear connectors and the wire spirals are accommodated are filled with concrete. Of course, this sequence may be varied. For instance, the concrete superstructure may be applied first and the studs then welded through the respective recesses, whereupon the spirals are put in position, and the recesses finally filled with concrete.

Sometimes resilient composite structures are required, wherein the concrete superstructure may shift slightly in relation to the steel beams. This kind of structure is used, for instance, in the region of supports for continuous girders. However, such structures are, in general, very complicated because the yielding must not be such that the bond between the concrete superstructure and the beam will become impaired.

Simple resilient composite structures are possible with the shear connector of the invention. If, for instance, the lower portion of the stud, along a certain length thereof, is embedded in a resilient material, such as rubber or the like, the stud can be bent resiliently within limits whilst the cover is retained by the upper portion of the stud with the upset end of said stud being embedded in the concrete. In this case the spiral serves the special purpose of absorbing the heavy local pressures which would otherwise be exerted by the stud, at the transition between the resilient material and the concrete, without any damage to the concrete.

The invention will be described further, by way of example, with reference to the accompanying drawings, in which:

FIG. 5 is a diagrammatic part-sectional side elevation showing a prior known shear connector embedded in concrete, after it has been overloaded for test purposes;

FIG. 6 is a view similar to FIG. 5, but showing a shear connector in accordance with the invention;

FIG. 7 is a part-sectional perspective view showing a modified composite structure in accordance with the invention;

FIG. 8 is a similar view showing a further embodiment; and

FIG. 9 is a similar view showing yet a further embodiment.

Figure 1:
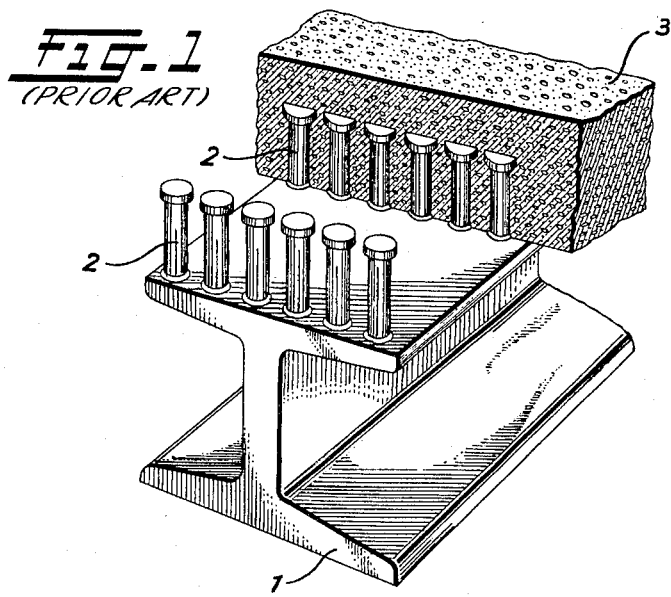
FIG. 1 is a part-sectional perspective view illustrating a prior known composite structure employing shear connectors.

The composite structure shown in FIG. 1 of the drawings comprises a steel beam 1 to which are welded studs or shear connectors 2, these being butt welded to the beam 1 in order to resist shear and tensile stresses after a concrete slab or like concrete superstructure 3 has been applied, i.e. to keep the concrete superstructure properly bonded. The usual steel rods or welded wire mesh which are commonly used for reinforcement of the concrete, have not been shown in the drawings, because they have nothing to do with the present invention.

Figure 2:
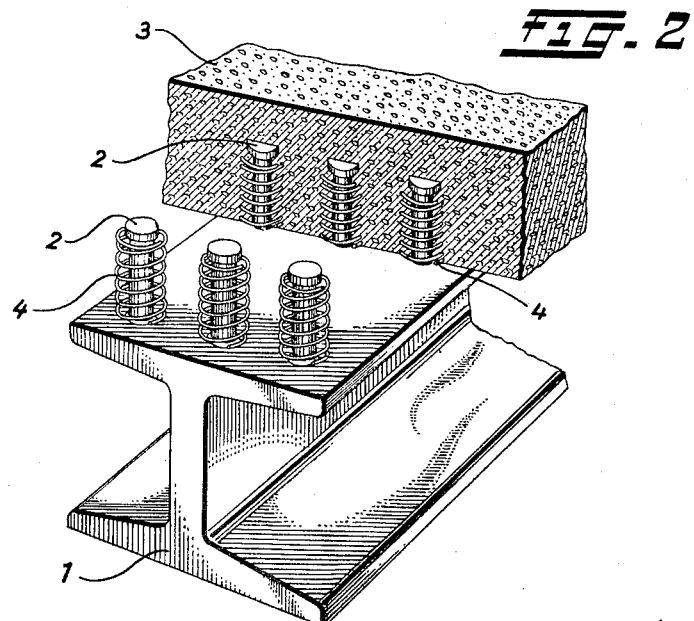
FIG. 2 is a similar view showing a composite structure according to the present invention.

In contrast to the arrangement of FIG. 1, the butt welded shear connectors 2 of FIG. 2 are fewer in number, and each one is surrounded by a wire spiral 4 which has a substantially flat inner turn which rest on the beam.

Figure 3:
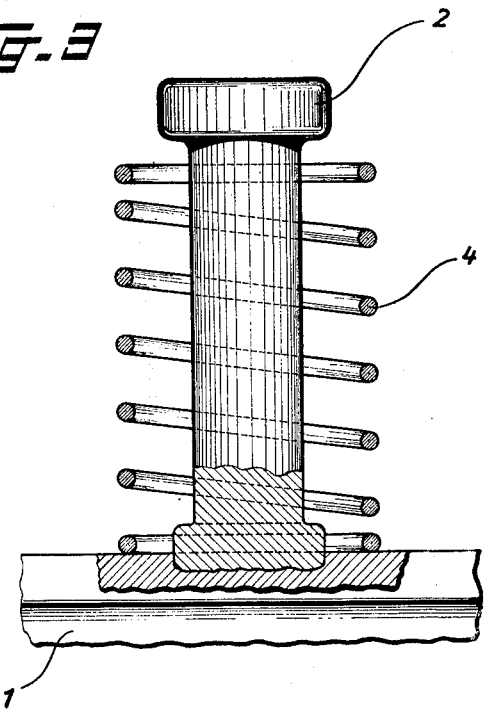
FIG. 3 is a part-sectional side elevation showing one of the shear connectors of FIG. 2 with its surrounding wire spiral.
Figure 4:
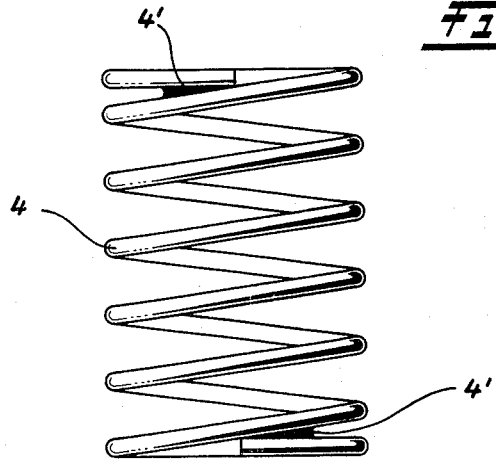
FIG. 4 is an elevation of the wire spiral of FIG. 3.

Details of the arrangement and the shape of the wire spiral 4 are to be seen in FIGS. 3 and 4. In FIG. 3, the shear connector 2 is shown affixed and the root or base thereof is butt welded over its entire section to the beam 1. The wire spirals 4, for reinforcement of the welded shear connectors 2, are each of a diameter which is, for example, several times the diameter of the shank of the connector 2, with a pitch for example corresponding to the actual diameter of the connector shank. If desired, an end of the spiral may be welded to an adjacent turn, as indicated at 4' in FIG. 4; however, other modifications of the spiral are also possible which will provide a substantially flat turn in a plane approximately perpendicular to the axis of the spiral so that when the spiral is placed on the beam its axis will be nearly parallel to the axis of the shear connector. This will allow the spiral to substantially surround the shear connector in the vicinity of the weld and cause it to be self-supporting as shown in FIGS. 2 and 4.

FIG. 5 shows a concrete slab 3' which was anchored by conventional welded shear connectors 2 to the beam 1, in the manner illustrated in FIG. 1. For test purposes, the slab 3' has been overloaded to the destruction point. The concrete slab 3' is not only fractured in itself, but has also become detached from flange 1' of the beam 1. Moreover, the welded shear connectors 2 did not resist the overload; they were either heavily bent as shown or became completely broken.

With an overload test of a structure such as shown in FIGS. 2 and 3, with the wire spiral 4 around the welded shear connector 2 and completely embedded in the concrete 3, the shear connector 2, the spiral 4 and the surrounding concrete 3 remained absolutely undisplaced, and the concrete remained intact over a surrounding area somewhat larger than the diameter of the spiral. Portions 3' of the concrete 3 became detached from flange 1' of the beam 1. However this occurred exclusively outside the wire spiral 4 around the stud 2 welded to the flange of the beam. Both tests were carried out in the same governmental test and research laboratory, using the newest equipment, and the above described results show clearly that a considerably higher degree of safety is achieved for the anchoring of the concrete to the steel beam if helical reinforcements of metal are provided around the welded studs. Therefore, the composite structure of the present invention permits either of heavier loads for a given construction; alternatively economies can be made, for instance in the number of shear connectors employed.

FIG. 7 shows a composite structure, according to the invention, which employs prefabricated concrete slabs 3". These slabs 3" are provided with recesses 5 which are slightly larger in diameter than the diameter of the metal wire spirals 4 around the shear connectors, so that each recess 5 accommodates one stud only. However, recesses 5' which accommodate several studs at once may also be provided. After the shear connectors 2 are welded to the flange 1' of the beam 1, and the spirals 4 have been positioned a layer of mortar (not indicated in the drawings) is applied to the flange 1' and the prefabricated concrete slabs or superstructure 3" is positioned on top of the flange. Then, fresh concrete 6 is poured into the recesses 5, 5' the walls of which should be as rough as possible. Of course, the spirals 4 could be put in position after the concrete superstructure 3" has been applied. There is the further possibility of welding the studs 2 to the flange 1' through the recesses 5' or 5" which are provided in the concrete superstructure, after the superstructure has been applied.

FIG. 8 shows an arrangement similar to that of FIG. 7, but in this instance, the recess 5" is of conical form, tapering downwards to a minimum diameter at the root of the stud.

FIG. 9 shows an embodiment of the composite structure of the invention which embodies a resilient insert. The lower portion of the stud 2 is surrounded by an insert of elastic or resilient material 7, for instance of rubber. A longitudinal groove is provided in the concrete slab and this accommodates the rubber insert which rests on the steel beam. The stud 2, which is rigidly embedded in the upper portion of the concrete 3 can be yieldingly deformed within the region of the resilient material 7, and this arrangement therefore permits of small movements of the concrete superstructure relative to the steel beam 1. When the structure is stressed in such a manner that the stud tends to enter the concrete, the spiral 4" prevents any cracking of the concrete under the strong bearing pressures exerted by the stud. The head of the stud prevents any separation of the concrete superstructure from the steel beam.

I claim:

1. A composite structure comprising a steel beam; a shear connector stud having an upset outer end, and an inner end which is butt welded to the beam, the axis of the stud being perpendicular to the surface of the beam at the point of connection; a generally cylindrically shaped helical wire reinforcement member surrounding the stud and having a substantially flat inner turn, the turn being in a plane which is substantially perpendicular to the axis of the helical reinforcement member, resting flat against the surface of the beam, the axis of the stud and the axis of the reinforcement member being nearly parallel, the inside winding diameter of the inner turn being greater in diameter than the largest diameter of the stud; and a concrete superstructure supported by the beam, with the shear connector and the reinforcement member embedded in the superstructure and the concrete of the superstructure permeated into and throughout the turns of the reinforcement member.

2. The structure of claim 1 wherein the concrete superstructure is a prefabricated concrete superstructure having a recess for the accommodation of the stud, and comprising in addition a concrete filling in the recess which provides said permeation throughout the turns of the reinforcement member and around the stud so as to anchor the superstructure to the beam.

References Cited by the Examiner

UNITED STATES PATENTS

| | | | |
|---|---|---|---|
| 1,260,331 | 3/18 | Collings | 50—474 |
| 1,673,630 | 6/28 | Madge | 50—271 |
| 2,050,290 | 8/36 | Earley et al. | 50—434 |
| 2,396,045 | 3/46 | Henderson | 50—443 |
| 2,897,668 | 8/59 | Graham | 50—446 |
| 2,987,855 | 6/61 | Singleton et al. | 50—290 |
| 3,138,899 | 6/64 | Hadley | 50—348 |

FOREIGN PATENTS 219,245 12/58 Australia.
179,364 11/35 Switzerland.

JACOB L. NACKENOFF, *Primary Examiner.*

HENRY C. SUTHERLAND, *Examiner.*